United States Patent [19]

Greenberg

[11] Patent Number: 5,183,503
[45] Date of Patent: Feb. 2, 1993

US005183503A

[54] METHOD OF SHAKER MOLDING AND COMPOSITION THEREFOR

[76] Inventor: Allen A. Greenberg, 3531 N. 47th St., Hollywood, Fla. 33021

[21] Appl. No.: 882,009

[22] Filed: May 13, 1992

[51] Int. Cl.$^5$ ................................................ C08L 5/00
[52] U.S. Cl. ................................ 106/38.51; 106/38.3; 106/38.35; 106/779; 264/333
[58] Field of Search ................. 106/38.3, 38.35, 38.51, 106/779; 264/333

[56] References Cited
U.S. PATENT DOCUMENTS 2,769,717 11/1956 Cresson ............................ 106/38.35
3,268,348  8/1966 Morrell ............................ 106/38.35
3,282,710 11/1966 Morrell ............................ 106/38.35
3,371,135  2/1968 Goodwin .............................. 264/71
3,958,997  5/1976 Greenberg ....................... 106/38.51
3,989,220 11/1976 Greenberg ........................... 220/4.21

Primary Examiner—Karl Group
Assistant Examiner—Anthony J. Green
Attorney, Agent, or Firm—Wegner, Cantor, Mueller & Player

[57] ABSTRACT

An improved molding powder which comprises alkali metal alginate, calcium salt, tetrasodium pyrophosphate and filler, the alginate being from *Laminaria hyperborea*. The mixture sets to form a rubbery object.

6 Claims, No Drawings

METHOD OF SHAKER MOLDING AND COMPOSITION THEREFOR

This invention relates to a molding composition and to a method of molding a child's plaything.

This invention relates principally to a novel molding powder mixture to be employed in a method of using a molding apparatus which includes a shaker-mixer device in which ingredients to be molded are added then are shaken and mixed before setting in the mold. A suitable molding apparatus is described in my prior U.S. Pat. No. 3,989,220 to which reference is made for a preferred embodiment of molding apparatus.

This invention is also directed to the method of forming the molded object in which water and a molding powder mixture are shaken together in a shaker-mixer mold device to cause intimate mixing of the water and the molding powder mixture; where the mixed water and molding powder mixture passes directly to a mold cavity wherein the object is molded. The method as such and suitable apparatus are described in my prior U.S. Pat. Nos. 3,958,997 and 3,989,220 respectively both of which are hereby incorporated by reference.

OBJECTIVES OF THE INVENTION

An object of this invention is to provide a molding method in which a molded plaything object of a strong rubbery-like consistency is formed directly in the mold cavity. Surprisingly and unexpectedly the freshly made molded object, i.e. the object when removed from the mold immediately after the recommended 5-10 minutes molding time is of sufficient strength to be handled and even played with by the youngster. Parenthetically it is noted that the freshly made molded objects made with the molding mixture materials described in my aforementioned prior patents were jelly-like and initially were very weak. At best they were barely self-supporting. They could not be handled immediately nor could they be played with by the youngster for at least 24 hours. The alginate (gelling) materials heretofore used resulted in molded objects that initially were so soft and weak as to require an internal (plastic) support while they dried and gained strength.

Another object of this invention is to provide a molding composition which generates a molded object therefrom that shrinks quickly, while coherently maintaining its molded shape, until ultimately a stiff object of substantially smaller size than the freshly molded object but of almost exactly the same shape results. Objects molded from the composition of this invention may be shrunk much faster than the similar objects described in my prior U.S. Pat. No. 3,958,997. This is a major marketing advantage, since the customer for this product are children and typically youngsters have no patience.

A further object of this invention is to provide a molding method and composition from which the freshly molded plaything object undergoes syneresis or loss of water therefrom. Both bound and unbound water leave the molded object as it dries.

A further object of this invention is to provide a molding method and composition from which the freshly molded plaything object is so strong and tough that it can be placed in a microwave oven, then shrunk at an accelerated rate, by microwave heating to evaporate water. Thus, a further object of this invention is to provide a molding method and composition in which the molded object can be subjected to accelerated shrinking and drying by heating same in a microwave oven, e.g. fifteen minutes of microwave treatment or less.

A still further object of the invention is to provide a molding method and composition in which the initial viscosity of the mixing powder-water admixture from which the molded object will be formed is high enough to prevent leakage past the sealing surfaces in the mold (thereby causing a mess). At the same time the molding mixture does not become highly viscous so quickly as to impede mixing efficiency nor hamper its ability to flow into the mold within about 60-120 seconds after mixing.

BRIEF STATEMENT OF THE INVENTION

Briefly stated, the present invention contemplates employment of the alkali metal alginate made from *Laminaria hyperborea* as the alginate gelling agent in the molding powder mixture compositions.

Thus, the present invention may be described succinctly as being an improvement in the molding method and composition described in prior U.S. Pat. No. 3,958,997 in that the alkali metal alginate from Laminaria hyperborea is substituted for the alkali metal alginate employed heretofore.

RATIONALE OF THE PRESENT INVENTION

Insofar as the inventor hereof was aware during the genesis of the inventions of U.S. Pat. Nos. 3,958,997 and 3,989,220, all alginates available to him are nearly the same, and all would exhibit more or less the same properties as the sodium and potassium alginates employed in practice of those patented inventions. It turns out that the inventor hereof then had available to him and was then familiar only with the algins and (alkali metal) alginates from sea weeds native to the North American continent, and in particular with the alginates recovered from giant kelp, i.e. from *Macrocystis pyrifera*, which species of sea weed grows in abundance in the water off the California coast, in large dense kelp beds. Principally, the alkali metal alginates of commerce in the U.S. are recovered from (California coast) giant kelp.

By and large, the alkali metal alginates from *Macrocystis pyrifera* and from most other species of sea weed, e.g. *Ascophylklum nodosum* and *Laminaria digitata*, that are harvested commercially for their algin content are reasonably similar in physical properties. It is the alginates from *Laminaria hyperborea* which are different. The alginates from *L. hyperborea* generate molded objects which exhibit unexpectedly advantageous properties. Instead of being jelly-like and almost non-self-supportable the freshly molded object as removed from the mold is coherent, self-supporting rubbery in texture. Advantageously, objects molded with the *L. hyperborea* alginates lose water through syneresis.

The *L. hyperborea* is recovered from the waters off the coast of Scotland.

Algin is a polysaccharide formed from mannuronic acid residues and guluronic acid residues linked into segments of three different polymer configurations. One segment consists essentially of repeating D-mannuronic acid residues; a second segment consists essentially of repeating L-guluronic acid residues; and, the third segment consists of alternating D-mannuronic acid and L-guluronic acid residues. In the algin polymer as a whole the ratio of mannuronic to guluronic residues varies somewhat species to species. Below reproduced to illustrate species similarities and differences are two Tables from a "Kelco" brochure entitled "Alginate Products for Scientific Water Control" (probably published 1987).

TABLE 2

Mannuronic Acid (M) and Guluronic Acid (G) Composition of Alginic Acid Obtained from Commercial Brown Algae

| Species | Mannuronic Acid Content (%) | Guluronic Acid Content (%) | M/G Ratio | M/G Ratio Range |
|---|---|---|---|---|
| Macrocystis pyrifera | 61 | 39 | 1.56 | — |
| Ascophyllum nodosum | 65 | 35 | 1.85(1.1) | 1.40–1.95 |
| Laminaria digitata | 59 | 41 | 1.45 | 1.40–1.60 |
| Laminaria hyperborea (stipes) | 31 | 69 | 0.45 | 0.40–1.00 |
| Ecklonia cava and Eisenia bicyclis | 62 | 38 | 1.60 | — |

TABLE 3

Proportions of Polymannuronic Acid, Polyguluronic Acid, and Alternating Segments in Alginic Acid Isolated from Brown Algae

| Source | Polymannuronic Acid Segment (%) | Polyguluronic Acid Segment (%) | Alternating Segment (%) |
|---|---|---|---|
| Macrocystis pyrifera | 40.6 | 17.7 | 41.7 |
| Ascophyllum nodosum | 38.4 | 20.7 | 41.0 |
| Laminaria hyperborea | 12.7 | 60.5 | 26.8 |

Thus, it may be seen in the above tabulated data that the alginic acid compositions vary relatively little, species to species of the sea weeds save that from *Laminaria hyperborea*. The *Laminaria hyperborea* algin contains about half of the mannuronic acid content, nearly double the guluronic acid content of the other algins.

The high polgulronic acid content in the algin from *Laminaria hyperborea* causes the alginate from *Laminaria hyperborea* to exhibit substantially different properties, property differences which are surprisingly and unexpectedly advantageous than the other alginates. For example, the alginates from *Laminaria hyperborea* forms relatively rigid gels (of calcium alginate) which tend to undergo syneresis (which is loss of bound water). In contrast the alginates from *Macrocystis pyrifera* or from *Ascophyllum nodosum* form elastic (calcium alginate) gels which deformed and which have markedly reduced tendencies toward syneresis; water can be removed only by drying the molded object.

The published studies on the make-up of alginates have hypothesized that the polymer segments made up of polymannuronic acid residues extends in a relatively flat or gentle wave ribbon configuration (wherein the glucan ring and the ribbon axis are equatorial and near to co-planar), whereas the segments made up of polgulronic acid residues is configured like a buckled or crinkled ribbon (wherein the glucan rings are linked di-axially). In the presence of calcium ions two of the crinkled ribbons orient face to face so as to cage a calcium ion within each pair of the opposing bends in the crinkled ribbons, somewhat like how the opposing upper and lower faces of a molded egg carton contains an egg inside each compartment formed by the open spaces between the opposing upper and lower surfaces of the egg carton.

Whatever the stereochemical reasons may be, a composition containing the alginate from *Laminaria hyperborea* molds into a plaything object that is self-sustaining on removal from the mold. The freshly molded object is strong and rubbery. (Comparable objects made with other alginates as, for example, the alginate from giant kelp, are weak, jelly-like, and barely self-sustaining.) The child can handle and play with the molded object immediately out of the molding apparatus. In addition, the molded object immediately begin to experience syneresis which over time causes the object to shrink and harden substantially. Desirably, the freshly molded object is sufficiently sturdy to be subjected to accelerated dewatering by heating in a microwave oven.

A preferred embodiment shaker-mixer-mold assembly is described in U.S. Pat. No. 3,989,220 to which reference is made for details. This assembly includes a measuring cup, a pair of mold sections which can be held in engagement with the edge of the measuring cup so that the mold cavity of the mold sections is in communication with the interior of the measuring cup, and a holder member inside which the mold sections are held in assembled relation to the measuring cup while the materials inside of the measuring cup and mold cavity are mixed and shaken.

To form a molded plaything, water and a molding powder mixture are placed in the measuring cup member, then the mold sections and the holder member are assembled over the measuring cup. After this, the water and molding powder mixture are shaken together inside this assembly to generate a uniform mixture. Finally, the assembly is inverted with the measuring cup member on top so that the now uniform fluid mixture will flow into the mold cavity wherein setting takes place and the plaything becomes molded.

The molding powder mixture of this invention will contain the sodium or potassium salt of the algin from *Laminaria hyperborea*. As has been pointed out this alginate is extremely high in guluronic acid residues (being some 60% alpha-L-gulopyranosyluronic acid residues in 1 C conformation). Also present in the molding powder mixture is a contributor of calcium ion, i.e. a calcium salt, which, for example, may be calcium sulphate or calcium lactate to generate the calcium alginate gel. A sequestrant like tspp, tsp, spp, etc. to control calcium solubility while the algin hydrates. A source of magnesium ion may be included in the mixture to facilitate gelatinization. A filler which, for example, may be diatomaceous earth is made part of the molding powder mixture to add rigidity to the resultant molded plaything. All that is needed is to add water, then mix and allow to set for 5–10 minutes.

Then the molded plaything is removed from the mold, it is coherent, self-sustaining rubbery, rather than jelly-like as had been the case heretofore with the other alginates. The plaything immediately begins to dry through evaporation and syneresis, and shrinks accordingly but, as the molded plaything object shrinks, it retains its shape to form ultimately a rigid dried object which is a miniature of the original molded plaything.

Indeed, the miniature retains the proportions of the original molding almost perfectly.

To begin a molding operation, the water is added to the measuring cup (not shown) to a level line which indicates the proper amount to add. Then to the water is added a batch of predetermined weight or volume of the molding powder mixture. The quantity is, of course, consistent with the quantity of water in the cup. In a preferred embodiment, the molding powder mixture consists of the following proportions:

---
11 percent sodium alginate from *Laminaria hyperborea* (for example, MANGUEL, DVT or MANGUEL, DMB)
14 percent $CaSO_4.2H_2O$
1 percent anhydrous tetrasodium pyrophosphate
5 percent $MgCO_3$
69 percent diatomeous earth (filler)
---

Optional colorant and preservatives can also be added.

All percentages are by weight, and all constituents are ground so as to form a powder mixture. The weight of a batch of molding powder should be approximately 20% of the weight of the water.

When the batch of molding powder and water has been added to a measuring cup of the sort, illustrated in U.S. Pat. No. 3,989,220, the mold halves are assembled atop the measuring cup with the mold holder to lock the mold halves and the measuring cup together with the batch of water and molding powder contained inside the mold halves and measuring cup. The aqueous mixture immediately becomes relatively viscous, and so does not leak from the assembly. Then the assembly may be shaken for approximately 30 seconds to thoroughly mix the molding powder and the water together. Thereafter, the assembly should be upended, cup on top, so the viscous but still fluid mixture flows into the mold cavity, and over time sets therein into a rubbery gel to become the freshly molded plaything. After approximately 5 minutes, the assembly may be taken apart, disassembled (as described in U.S. Pat. No. 3,989,220) and the rubbery molded plaything object removed.

As removed from the mold halves, the freshly molded plaything object exhibits a coherent rubbery consistency. As the plaything loses water through syneresis and evaporation, it shrinks proportionately so as to retain its shape and appearance. Eventually, after a few days of drying at room temperature, or 1 day of drying in an air stream (fan) or microwave heated for 15 minutes, the plaything becomes a rigid dry to the touch object having a volume of approximately one-third the original volume of the freshly molded subject. In this regard there is little difference from the molded object described in U.S. Pat. No. 3,958,997.

Desirably the improved firmness (i.e. rubbery rather than jelly-like) of the freshly molded object plaything attributed to substitution of the alginate from *Laminaria hyperborea* for the giant kelp alginate, allows the youngster to accelerate drying by placing the freshly molded plaything object in a microwave oven. Less than fifteen minutes (at full microwave power) will dry a freshly molded plaything object thoroughly.

On the whole, the proportions of alkali metal alginate from *Laminaria hyperborea* to be used may vary from about 7 to about 15 percent of the molding powder mixture (dry basis) with the percentage of calcium salt, e.g. $CaSO_4.2H_2O$ always being about 1.2 times the percentage of alkali metal alginate, wt/wt basis. The percentage of the tetrasodium pyrophosphate may be varied from ¾ percent to approximately about 3 percent, but with more than 3 percent tetrasodium pyrophosphate, setting or gelling time becomes more lengthy, may be one-half hour or more. Large enough percentages of tetrasodium pyrophosphate to result in setting or gelling times longer than one-half hour, might well be in excess of the youngster's patience as well as a degradation of tensile strength.

The balance of the molding powder mixture to 100% wt/wt, is the filler. Diatomaceous earth is the preferred filler for inclusion in the molding powder mixture composition but other inert fillers may, of course, be used in place of diatomaceous earth, e.g. silica, magnesium carbonate, and kaolin (china clay).

As has already been pointed out preferred practice molding uses about 6 parts of water per part of molding powder mixture. More generally, 5-10 parts of water per part of molding powder mixture may be used.

I claim:

1. In a method of forming a molded object which comprises mixing together approximately 5-10 parts by weight of water and one part by weight of a molding powder mixture consisting essentially of from 7 to 15 percent by weight alkali metal alginate, a calcium salt in amount equal to about 1.2 times by wt. the amount of alkali metal alginate, and ¾ to 3 percent tetrasodium pyrophosphate, the remainder being a filler selected from the group consisting of diatomaceous earth, silica, magnesium carbonate, and kaolin, allowing the mixture to set and gel in a mold, and drying the resulting gelled object outside the mold to form a smaller rigid object, the improvement which comprises employing the alginate from *Laminaria hyperborea*.

2. A method of forming a molded object which comprises mixing together approximately 6 parts of water and one part of a molding powder consisting essentially of from 7 to 15 percent alkali metal alginate from *Laminaria hyperborea*, an amount of calcium sulfate equal to about 1.2 times the amount of alkali metal alginate, and ¾ to 3 percent tetrasodium pyrophosphate, the remainder being an inert filler, all parts and percentages being by weight, allowing the mixture to set and gel in a mold to form a rubbery object, and drying the rubbery object outside the mold to form a smaller rigid molded object.

3. A method as in claim 2 wherein the alkali metal alginate is approximately 10 percent of the molding powder.

4. A method as in claim 2 wherein the filler is diatomaceous earth.

5. A molding powder mixture consisting essentially of 7 to 15 percent alkali metal alginate from *Laminaria hyperborea*, an amount of calcium sulphate equal to 1.2 times the amount of alkali metal alginate, and ¾ to 3 percent tetrasodium pyrophosphate, the remainder being an inert filler, all percentages being by weight.

6. A molding powder mixture as in claim 5 wherein the percentage of alkali metal alginate in the molding powder is approximately 10 percent.

* * * * *